United States Patent
Cowell et al.

(10) Patent No.: US 10,836,611 B2
(45) Date of Patent: Nov. 17, 2020

(54) SWIVELS

(71) Applicant: Treemagineers Ltd., Scotland (GB)

(72) Inventors: Christopher Sidney Cowell, Scotland (GB); Elliot James Tanner, North Wales (GB)

(73) Assignee: TREEMAGINEERS LTD., Pitlochry (GB)

( * ) Notice: Subject to any disclaimer, the term of this patent is extended or adjusted under 35 U.S.C. 154(b) by 657 days.

(21) Appl. No.: 15/664,943

(22) Filed: Jul. 31, 2017

(65) Prior Publication Data
US 2018/0029847 A1   Feb. 1, 2018

(30) Foreign Application Priority Data

Aug. 1, 2016 (GB) .................................. 1613230.0
Jul. 26, 2017 (EP) .................................... 17183386

(51) Int. Cl.
*F16C 11/10* (2006.01)
*F16G 15/08* (2006.01)
*B66C 1/66* (2006.01)

(52) U.S. Cl.
CPC ................ *B66C 1/66* (2013.01); *F16C 11/10* (2013.01); *F16G 15/08* (2013.01)

(58) Field of Classification Search
CPC .......... F16C 11/04; F16C 11/10; F16G 15/08; Y10T 403/32975; Y10T 403/32213; Y10T 403/32262; Y10T 403/32377; Y10T 403/32549; Y10T 403/32557; Y10T 403/32591
See application file for complete search history.

(56) References Cited

U.S. PATENT DOCUMENTS

| 1,441,179 | A | * | 1/1923 | Schumacher | ........... F16G 15/08 |
| | | | | | 59/95 |
| 1,605,187 | A | | 11/1926 | Holt | |
| 2,506,593 | A | | 5/1950 | Hertel et al. | |
| 3,033,596 | A | * | 5/1962 | Pearring | ................. F21V 21/29 |
| | | | | | 285/261 |

(Continued)

FOREIGN PATENT DOCUMENTS

| GB | 2415999 A | 1/2006 |
| WO | 88/00272 A1 | 1/1988 |

*Primary Examiner* — Jonathan P Masinick
(74) *Attorney, Agent, or Firm* — Nixon & Vanderhye (57) ABSTRACT

A swivel comprises a first body component and a second body component with an interconnection assembly for interconnecting the first and second body components and to allow mutual rotation of the first and second components about a swivel axis. The swivel further includes a rotation limiting arrangement which, in a release condition, allows free mutual rotation of the first and second body components and in a first or a second locking condition restricts mutual rotation of the first and second body components. A user control is operable to selectively cause the rotation limiting arrangement to adopt one of a locking condition and the release condition. In the first locking condition, the rotation limiting arrangement prevents mutual rotation of the first and the second body components and in the second locking condition, the rotation limiting arrangement, allows limited mutual rotation of the first and second body components by less than 360°.

17 Claims, 9 Drawing Sheets

(56) References Cited

U.S. PATENT DOCUMENTS

| | | | | |
|---|---|---|---|---|
| 4,723,804 | A * | 2/1988 | Gatens | B66C 1/34 294/82.11 |
| 5,312,199 | A * | 5/1994 | Smith, Jr. | F16C 11/00 403/119 |
| 9,239,127 | B2 * | 1/2016 | Kronung | F16C 11/10 |
| 10,274,046 | B2 * | 4/2019 | Cowell | F16G 15/08 |
| 2015/0300399 | A1 | 10/2015 | Ivanic | |

* cited by examiner

Fig 18

SWIVELS

BACKGROUND TO THE INVENTION

Field of the Invention

This invention relates to swivels.

A swivel is an anti-torsion device for reducing the twisting loads within climbing and lifting systems. Traditionally, these have constituted of an assembly that includes pair of swivel bodies with a thrust or roller bearing joining the two bosses to enable them to spin independently. Without a swivel, torsional forces could cause damage or failure to other parts of a climbing or rigging system by applying a too high torsional loading, or alternatively could allow a mass to spin uncontrollably. Existing swivels are intended to provide a 360° rotation action and are able to rotate clockwise or anti-clockwise for an indefinite number of rotations.

SUMMARY OF THE INVENTION

The present inventors have realised that in some applications in which a user might require a connection between components in which in one instance allows 360° rotation (as with a conventional swivel), in another instance allows a limited rotation range such as 220°, and in another prevents rotation. At present, this would require the user to uncouple themselves from their system to remove the swivel to stop rotation or attach to a fixed object, and there is no current solution available to limit rotation to a predefined angle.

An aim of this invention is to provide a connecting component that can operate as a conventional swivel, can allow limited rotation, and/or prevent rotation altogether, and which allows a user to easily select the required mode of operation.

To this end, the present invention provides a swivel comprising:
a. a first body component and a second body component;
b. an interconnection assembly for interconnecting the first body component and the second body component and to allow mutual rotation of the first and the second components about a swivel axis;
c. a rotation limiting arrangement which, in a release condition, allows free mutual rotation of the first and the second body components and in a locking condition restricts mutual rotation of the first and the second body components; and
d. a user control operable to selectively cause the rotation limiting arrangement to adopt one or other of a locking condition and the release condition.

The invention is preferably characterised in that in the first locking condition, the rotation limiting arrangement substantially prevents mutual rotation of the first and the second body components and in the second locking condition, the rotation limiting arrangement, allows limited mutual rotation of the first and the second body components by less than 360°.

When using a swivel embodying the invention, it is possible for the user to select whether the swivel should allow free rotational movement between components to which it is connected or should restrict such rotational movement simply by operating the user control. This avoids the necessity of dismantling and re-assembling a climbing or rigging system in order to achieve that change of function.

Alternatively or additionally, in the rotation limiting arrangement, in the second locking condition, typically, the limited mutual rotation is in excess of 90°. More typically, the limited mutual rotation may be in excess of 200° or 220°. There are further possible alternative arrangements. For example, the second rotation limiting arrangement may allow mutual rotation of the first and the second body components in a plurality of separate rotational ranges. Alternatively or additionally, the limiting arrangement, in the first locking condition, may substantially prevent mutual rotation of the first and the second body components at one of several mutual rotational positions. In some embodiments, the rotation limiting arrangement can be assembled in a plurality of configurations to enable the position of mutual rotation at which rotation is limited to be adjusted.

Typically, a locking component of the rotation limiting arrangement, in a locking condition (i.e., the first or second locking condition), obstructs free movement of a cooperating component of the interconnection assembly. The rotation limiting arrangement is typically fixed against rotation with respect to the first body component and the cooperating component of the interconnection assembly is fixed against rotation with the second body component. The cooperating component of the interconnection assembly may include one or more recessed regions, and when the rotation limiting arrangement is in a locking condition, permits the cooperating component to occupy only a rotary position in which a recessed region is proximal to the locking component.

In typical embodiments, the locking component is moved by the user control to cause the rotation limiting arrangement to adopt one of a locking condition or the release condition. For instance, the locking component is rotated by the user control to cause the rotation limiting arrangement to adopt one of a locking condition and the release condition. In alternative arrangements, the locking component may be moved linearly.

Movement of the locking component to the release position may cause a recess of the locking component to move to a position in which it is proximal to the cooperating component. Or, alternatively, movement of the locking component to a locking position may cause a projection of the locking component to move to a position in which it is proximal to the cooperating component.

The interconnection assembly may include fasteners such as a nut and/or a bolt fixed for rotation with the first or the second body component. At least two of the nut, the bolt and the second body component are interconnected by interconnection formations, such as splines or mutually-engaging shaped formations, which could polygonal, e. g., square, triangular, hexagonal or star-shaped, amongst other possibilities. The interconnection assembly may also include a thrust bearing that permits rotational movement between the first body component and nut and bolt. Advantageously, a visible part of the nut or the bolt carries indicia that indicate to a user rotational positions of the first and second body components at which the rotation limiting component may adopt a locking condition.

Each or either of the first and the second body components most typically includes a connection formation that allows it to be connected to another component. Such formations may include one or more of an eye, a hole, a boss, a shackle, a pulley or a carabiner, amongst many other alternative possibilities.

DETAILED DESCRIPTION OF THE PREFERRED EMBODIMENTS

Embodiments of the invention will now be described in detail, by way of example, and with reference to the accompanying drawings.

Figure 1:
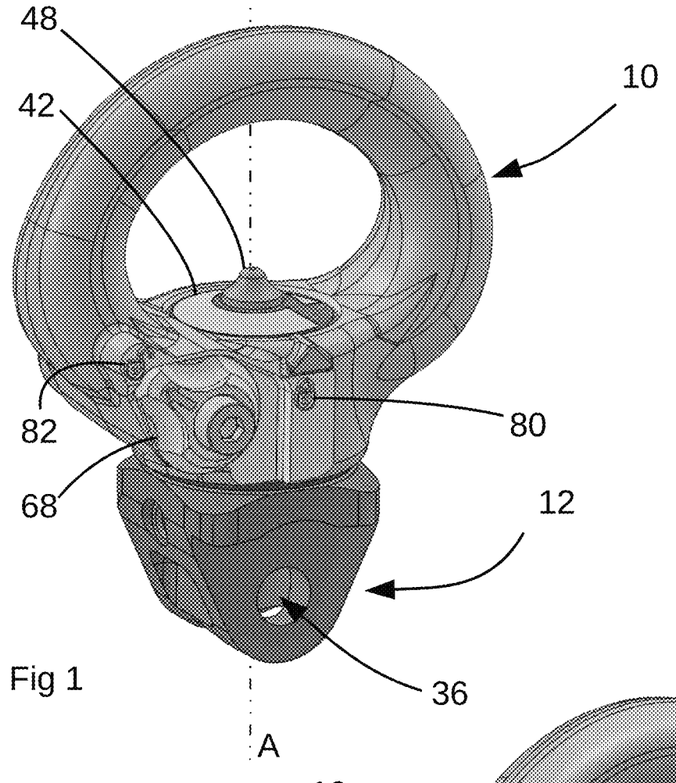
FIGS. 1 and 2 are views in opposite directions of a swivel being a first embodiment of the invention in a first condition which permits free rotation.
Figure 2:
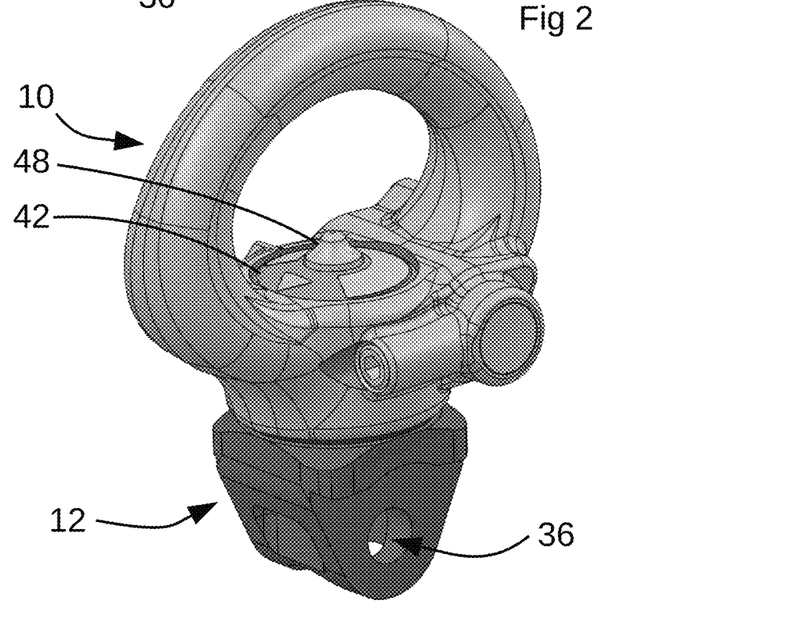
Figure 7:
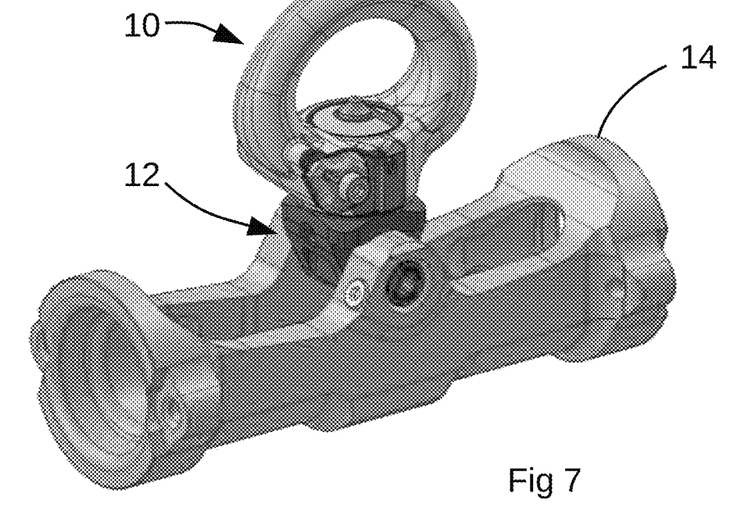
FIG. 7 shows an application of the swivel of FIGS. 1 to 4.

With reference to FIGS. 1 and 2, a swivel embodying the invention comprises an eye 10 being a first body component and a boss 12 being a second body component. This configuration of swivel can be used to interconnect a rigid component 14 (shown in FIG. 7) to which the boss 12 is attached, and a flexible component, such as a rope or webbing or a carabiner to which the eye 10 is attached.

The eye 10, a unitary metal component, comprises a loop that extends from a connection region. In the connection region, the eye 10 includes a bearing chamber 20 that is a cylindrical void centred on a swivel axis A of the swivel and opening in a direction facing away from the boss 12. The eye 10 has a flat, annular bearing surface that faces towards the boss 12 and extends in a plane normal to the axis A. A circular aperture extends through the bearing surface centred on the axis A, passing through a base surface of the bearing chamber 20. The aperture is of diameter less than that of the bearing chamber. A transverse cylindrical bore 22 extends through the eye 10 normal to the axis A, to partly intersect with the bearing chamber 20.

The boss 12, a unitary metal component, is a body with an axial through-bore. The boss 12 has a short key 32 that projects from the body, into which the bore extends, and which is surrounded by an annular bearing surface on which is carried a washer 34. The key 32 has a cylindrical outer surface and an axial bore of square section. The bore has a step such that a portion remote from the key 32 is of greater diameter than a portion at the key 32. The body also has a transverse bore 36 that is used to connect it with another component.

In the assembled swivel, the eye 10 and the boss 12 are disposed such that their bearing surfaces face one another and are in contact with the washer 34, and the key 32 of the boss projects into the circular aperture of the eye 10, wherein it is a close sliding fit.

Figures 3, 4:
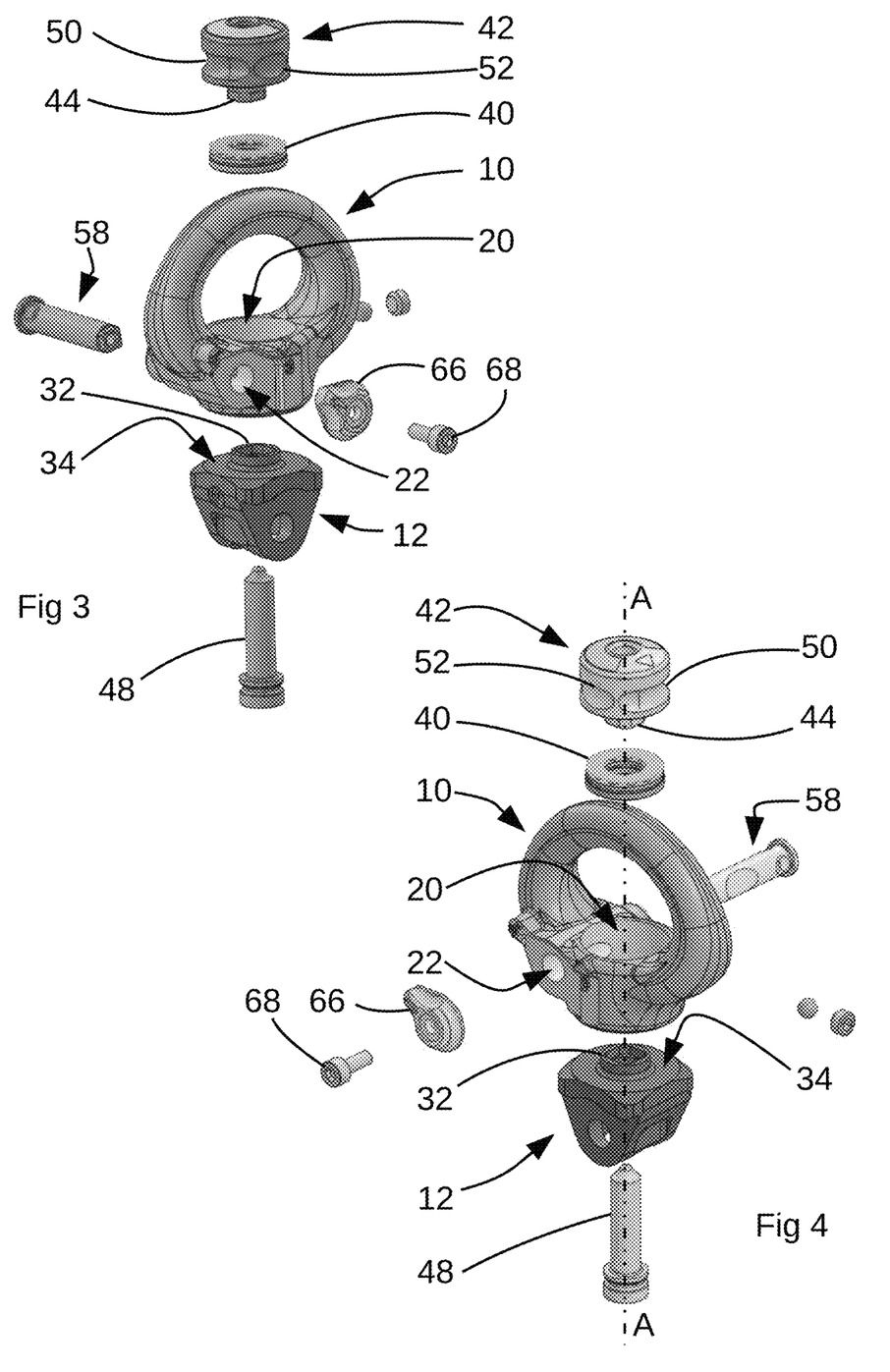
FIGS. 3 and 4 are exploded views corresponding to FIGS. 1 and 2.
Figure 5:
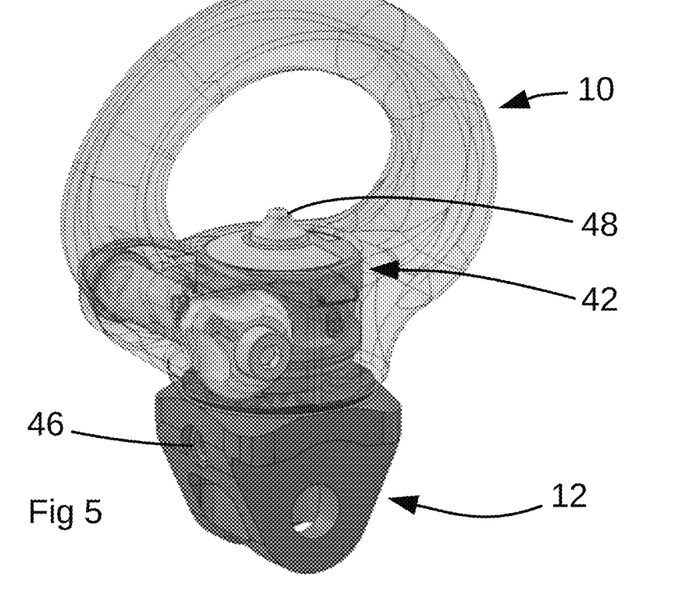
FIGS. 5 and 6 show the swivel of FIGS. 1 and 2 with a first body component shown semi-transparent and with the first body component omitted.
Figure 6:
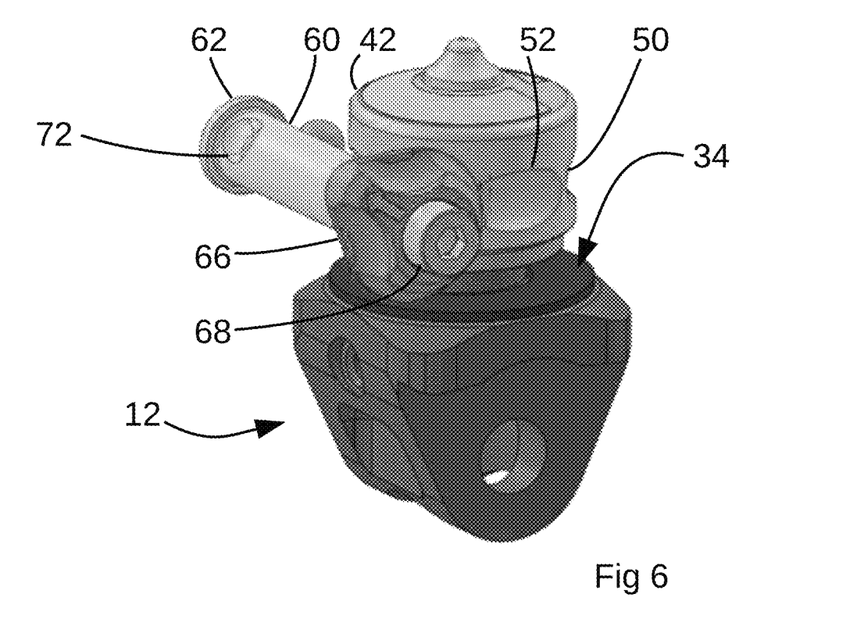

A thrust bearing 40 is located within the bearing chamber 20, a first race of the thrust bearing being carried on the base surface of the bearing chamber 20. An axle nut 42 is also located within the bearing chamber 20. The axle nut 42 has an axial threaded bore and an annular bearing surface which is in contact with a second race of the thrust bearing 40. A spigot 44 of square section projects centrally from the bearing surface of the axle nut 42 and extends into the bore of the key 32, wherein it is a close fit. Thus, rotation of the axle nut 42 with respect to the boss 12 is prevented. An axle bolt 48 has a head and an externally threaded shank. The head is located against the step within the bore of the boss 12, and the shank extends through the key 32 to make threaded connection with the bore of the axle nut 42. A grub screw 46 is tightened in a tapped bore in the boss 12 to make contact with the head of the axle bolt 48 to prevent rotation of the axle bolt 48 with respect to the boss 12 and the axle nut 42.

It will be seen that the arrangement described above is essentially that of a conventional swivel. The thrust bearing 40 and the bearing surfaces allow the eye 10 to rotate about the axis A with respect to the boss 12, and the axle nut 42 and the axle bolt 48 prevent separation of the eye 10 and the boss 12.

The axle nut 42 has a cylindrical outer surface within which a first and a second channel 50, 52, each being of arcuate cross-section, are formed. The first channel 50 extends peripherally around the nut 42 for approximately 220° and has a base that, for most of its length, follows an arcuate path within the circular cross-section of the nut 42. The second channel 52 extends peripherally around the nut 42 for approximately 60° and has a base that follows a straight chord that within the circular cross-section of the nut 42. The channels 50, 52 are formed on the nut 42 at a position such that the nut can be rotated to position the channels adjacent to the place at which the transverse bore 22 of the eye 10 intersects the bearing chamber 20.

A locking shaft 58 is located within the transverse bore 22. The locking shaft 58 has a cylindrical shank 60, carrying a head 62 at one of its ends and having an axial tapped hole extending into an opposite end portion. An end portion 64 of the shank 60 surrounding the tapped hole is formed with a square cross-section. This allows the locking shaft 58 to be installed in the transverse bore 22 by inserting the tapped end of the shank 60 into the bore until the head 62 makes contact with the eye 10, whereupon further movement is prevented. An operating lever 66 is secured to the locking shaft 58 by a cap screw 68, the operating lever 66 having a recess into which the end portion of square cross-section is received. The presence of the operating lever 66 prevents removal of the locking shaft 58 from the bore 22 and also allows a user to rotate the locking shaft 58 within the bore 22.

Figures 8, 9:
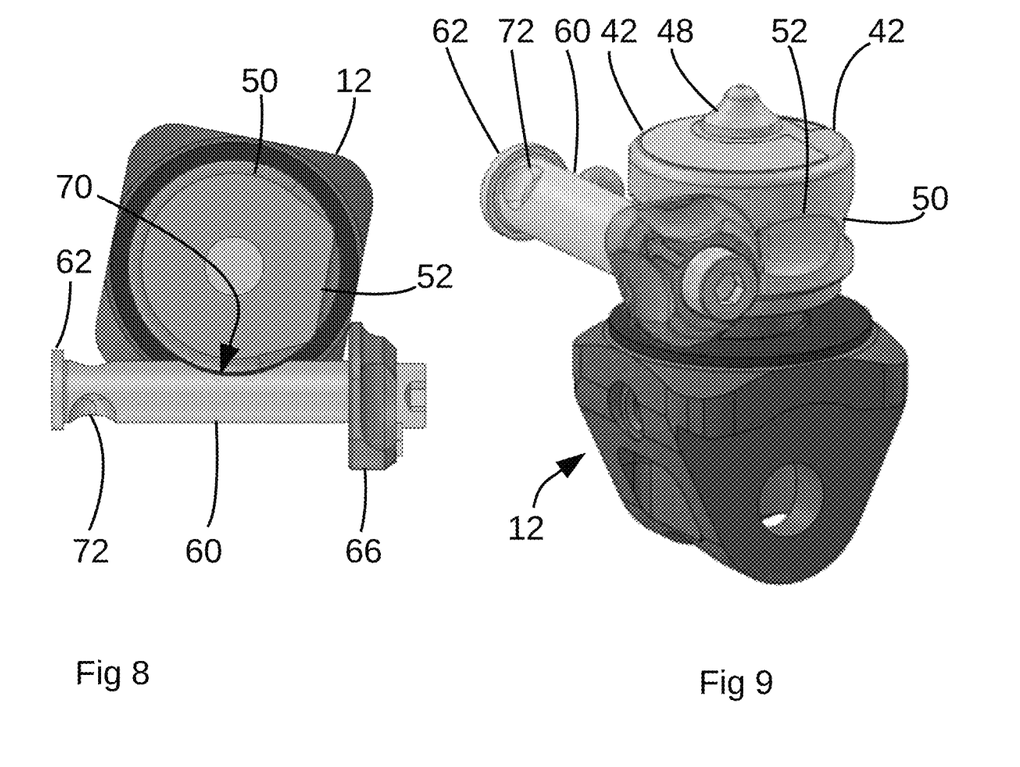
FIGS. 8 and 9 show internal components of the swivel of FIGS. 1 to 4 in the first condition of free 360° rotation.

A channel 70 is formed in the shank 60 of the locking shaft 58. The channel 70 is arcuate in section and is centred on a locus that, when the shaft is suitably rotated, as shown in FIG. 8, is coincident with the swivel axis A. Close to the head 62 of the locking shaft 58, two circumferentially-spaced recesses 72 are formed in the shank 60.

Figure 14:
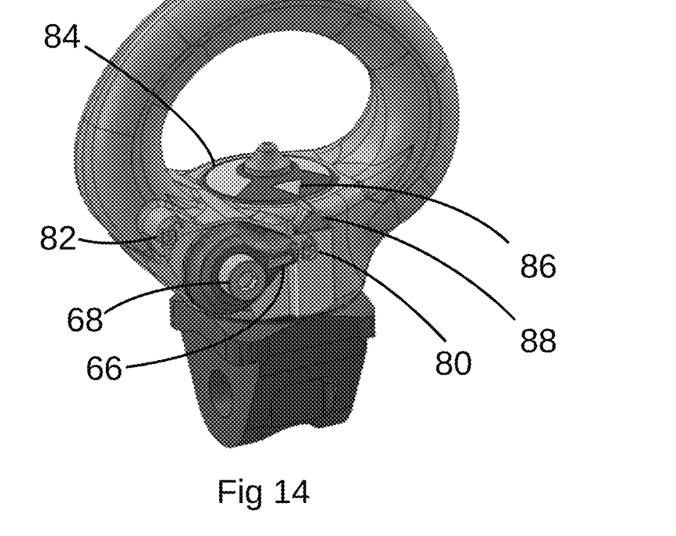
FIG. 14 is a view equivalent to FIG. 1 with the swivel in the third condition.

Within the eye 10, a ball bearing 74 is pressed by a spring against the shank 60, such that the ball bearing 74 can enter one or other recess 72 to provide a detent at one of two rotary positions of the locking shaft 58, which will be referred to as the locking and the release positions. This is achieved by moving the operating lever 66 between the positions shown in FIGS. 1 and 14. At the release position, the channel 70 faces directly towards the axle nut 42, as shown in FIG. 8. At the locking position, a full-radius portion of the shank 60 faces towards the axle nut 42, as shown in FIGS. 10 and 12.

In the release position, there is no interference between the locking shaft 58 and the axle nut 42 which allows free rotation between the eye 10 and the boss 12. However, in the locking position, the axle nut may only adopt a rotational position that causes one or other channel 50, 52 to face the locking shaft 58. Any attempt to rotate the axle nut to a position in which a part that has no recess faces towards the locking shaft 58 is prevented as the locking shaft 58 comes into contact with the end of the channel 50, 52. It will also be seen that the locking shaft 58 cannot be rotated into the locking position unless there is one or other channel 50, 52 adjacent to it.

Figure 10:
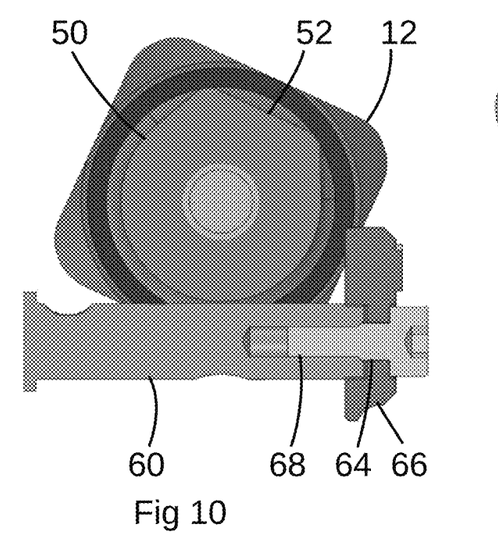
FIGS. 10 and 11 show internal components of the swivel of FIGS. 1 to 4 in a second condition which permits limited rotation.
Figure 11:
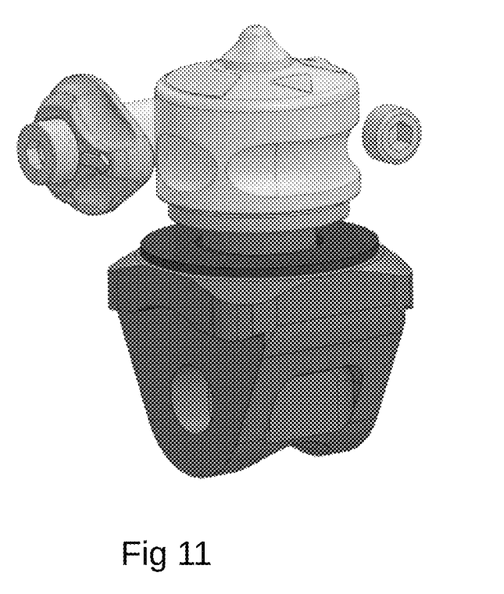
Figure 12:
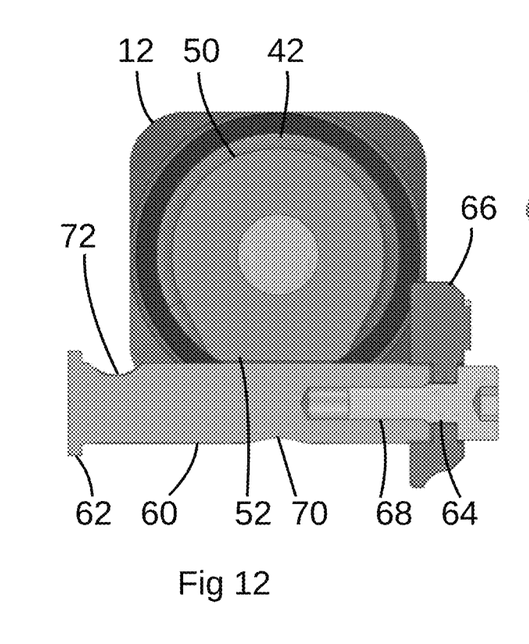
FIGS. 12 and 13 show internal components of the swivel of FIGS. 1 to 4 in a third condition which prevents rotation.
Figure 13:
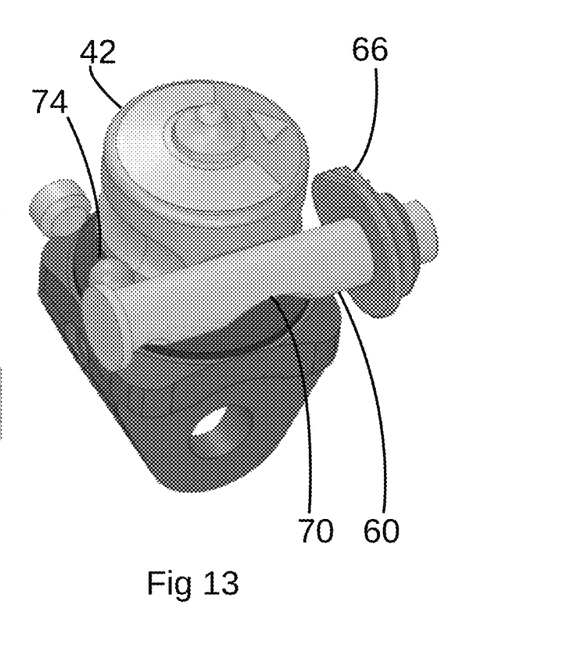

This provides three conditions of operation:
- a first condition (the release condition), shown in FIGS. 8 and 9, in which the locking shaft 58 is in the release position, in which the eye 10 and the boss 12 can rotate freely about the swivel axis A;
- a second condition (the first locking condition), shown in FIGS. 10 and 11, in which the locking shaft 58 is in the locking position and is adjacent to the first channel 50, in which the eye 10 can rotate with respect to the boss 12 about an angle that is restricted by the circumferential length of the first channel (approximately 220° in this embodiment); and
- a third condition (the second locking condition), shown in FIGS. 12 and 13 in which the locking shaft 58 is in the locking position and is adjacent to the second channel 52, in which the rotation of the eye 10 with respect to the boss 12 is substantially prevented.

It will be noted that the position and depth of the second channel 52 is chosen such that the shank 60 of the locking shaft 58 closely approaches its base to minimise possible rotational movement of the axle nut 42.

For the assistance of a user, several indicia may be provided on the swivel. Locked and unlocked symbols 80, 82 indicate to a user the positions of the operating lever 66 corresponding to the locking and release positions of the locking shaft 58. A visible outer surface of the axle nut 42 has visible indicia 84, 86 and an associated pointer 88 is carried on the eye 10. Only when the eye 10 is rotated to a position in which the pointer 88 is adjacent to one of the indicia 84, 86, may the operating lever 66 be moved to the locking position. The indicia 84, 86 are formed to indicate symbolically the amount of rotation provided by the second condition of operation or that in the third condition, no rotation will be possible.

Figure 15:
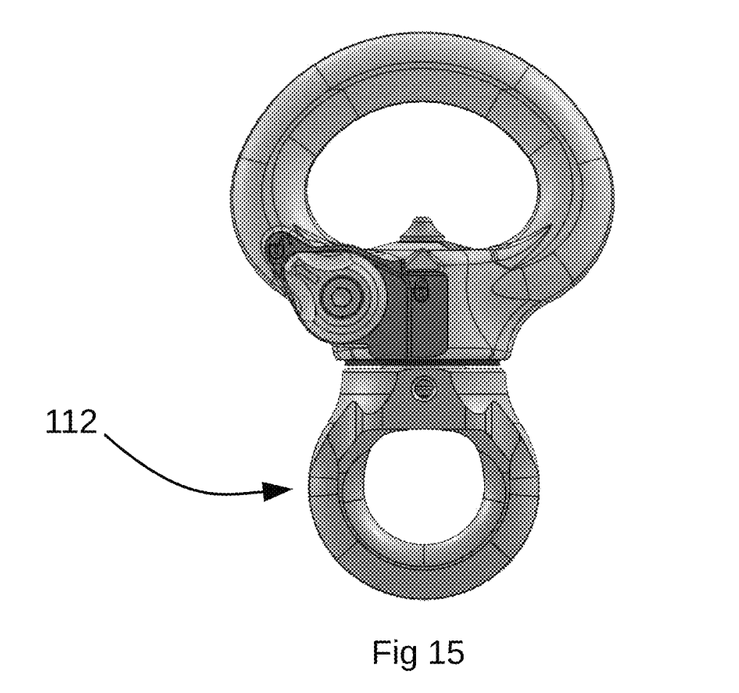
FIG. 15 shows a second embodiment of the invention.

In the embodiment of FIG. 15, the second body component is an eye 112, but the swivel is otherwise identical in construction and operation to that described above. This is just one example of many possible alternative embodiments of the invention.

In modifications to this embodiment, the second channel 52 may be omitted, which allows the circumferential extent of the first channel to be increased. Such an embodiment can adopt only the first and second conditions. Alternatively, several channels similar to the second channel 52 may be provided. Such an embodiment can adopt only the first and third conditions, but the swivel can be locked in the third condition with the first and the second body components at several different positions of mutual rotation. Further combinations of grooves of both types may be provided to implement different patterns of rotation.

Additional versatility in the positions at which rotation of the body components 10, 12 are limited can be provided by a modification to the key 32 and the spigot 44. In the above-described embodiment, these are of square section, but the functional requirement is that they couple together for rotation when the spigot 44 is inserted into the key 32. The square arrangement allows the components to be connected together in four distinct orientations, which means that the first and second body components 10 can adopt one of four distinct orientations when in the third condition. If, instead of being square, the spigot 44 and the key 32 are splined, then a greater range of orientations between the components can be adopted, and depending on the required use/orientation requirements of the swivel i.e. the positions of locked rotation and limited rotation are not limited to the orientations shown in the figures. Thus, the rotation limiting arrangement can be assembled in a plurality of configurations to enable the position of mutual rotation at which rotation is limited to be adjusted.

It will be seen that, when the rotation of the body components 10, 12 is limited, then rotation is prevented by a torque that arises between the axle nut 42 and the boss 12, rotational coupling being achieved by interaction of the spigot 44 and the key 32.

Figure 16:
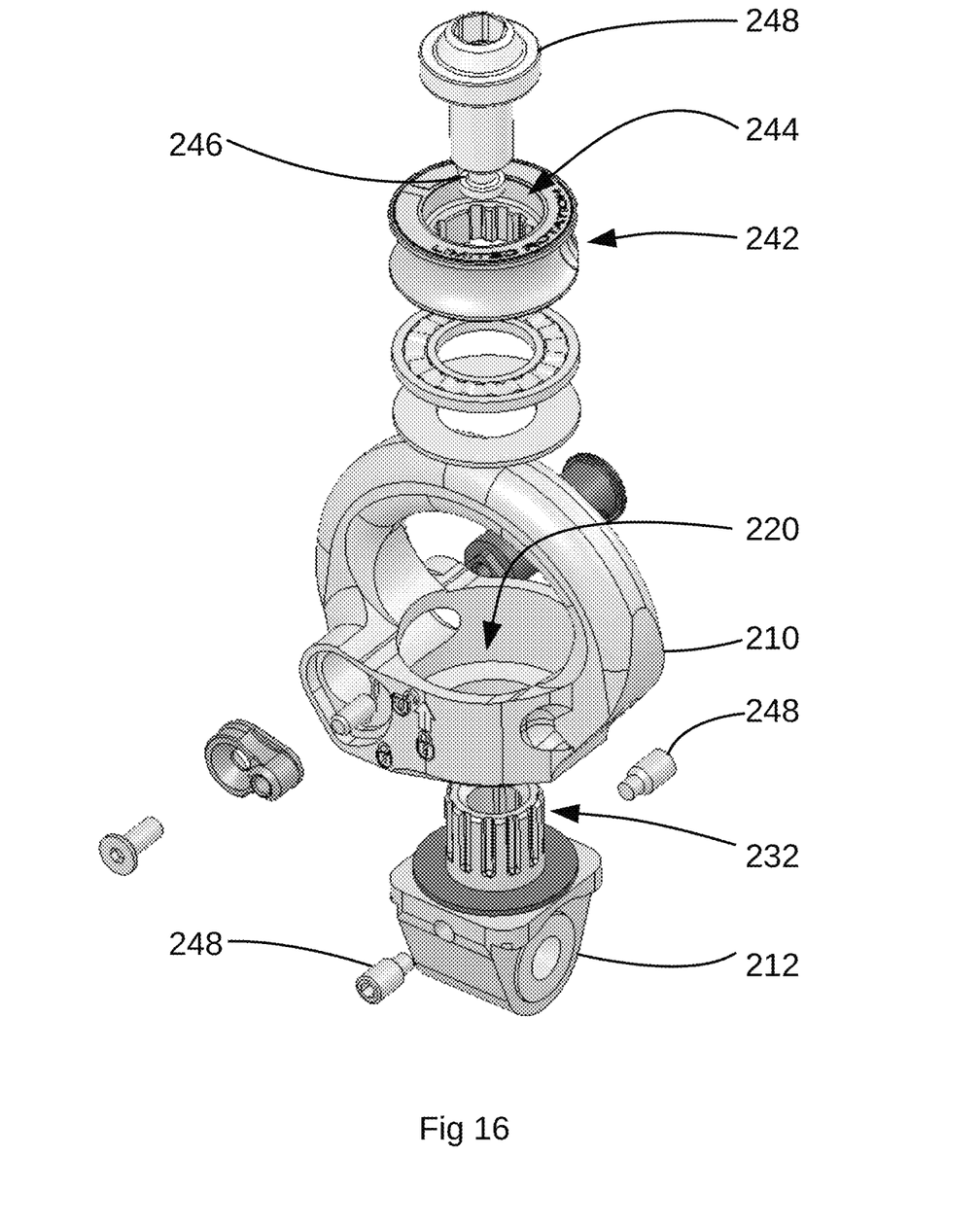
FIG. 16 is an exploded view of a third embodiment of the invention.
Figure 17:
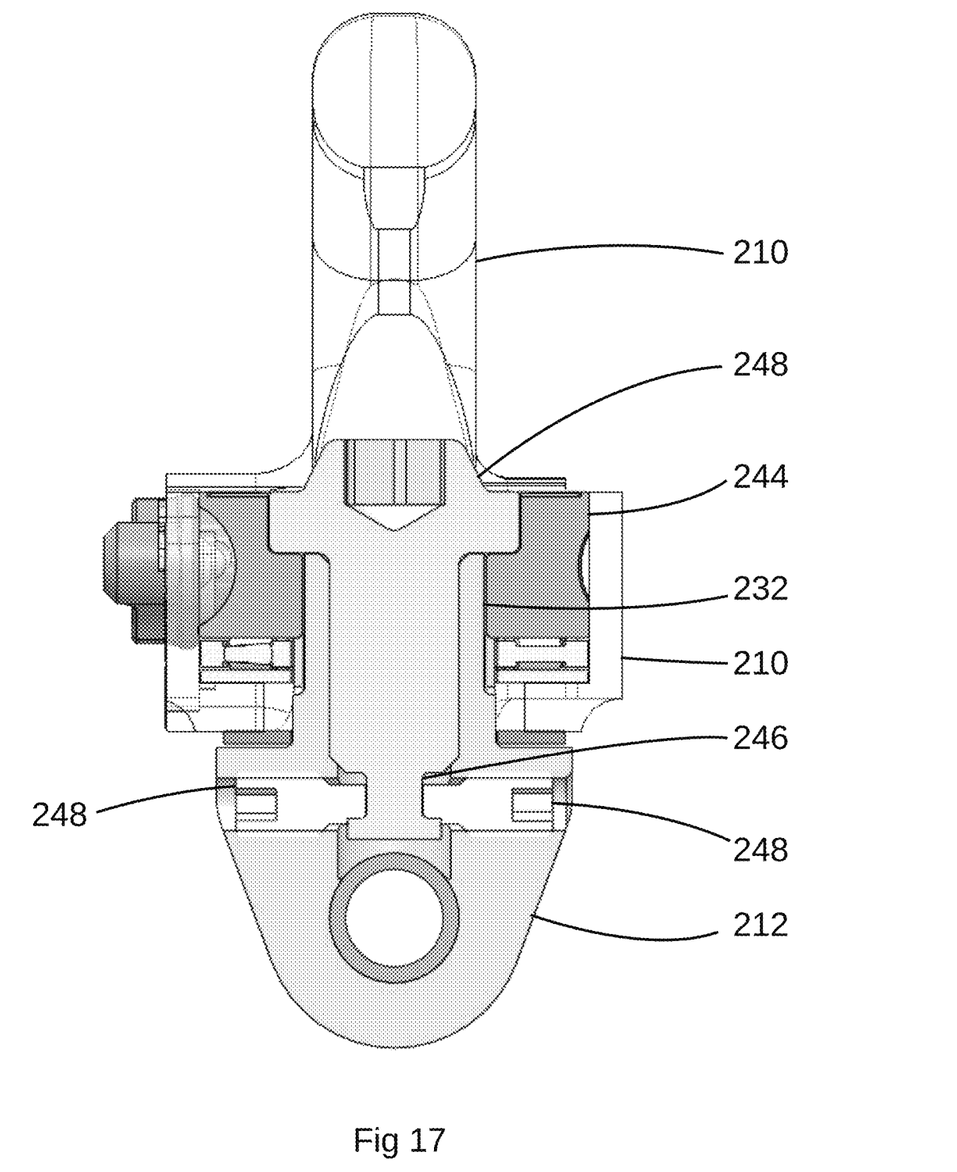
FIG. 17 is a cross-section of the embodiment of FIG. 16.

In the embodiment shown in FIG. 16, the boss 212 has an externally splined spigot 232 that engages with a splined bore 244 in the axle nut 242. The axle nut 242 is received in a chamber 220 of the eye 210. The axle bolt 248 has a head that abuts the axle nut 242, and a threaded shaft that passes through the axle nut 242 to be received in a threaded bore in the boss 212. A circumferential groove 246 is formed close to a free end of the threaded shaft. Grub screws 248 are inserted into bores in the boss 212 to engage with the groove 246 and thereby prevent removal of the axle bolt 248 from the boss 212.

Figure 18:
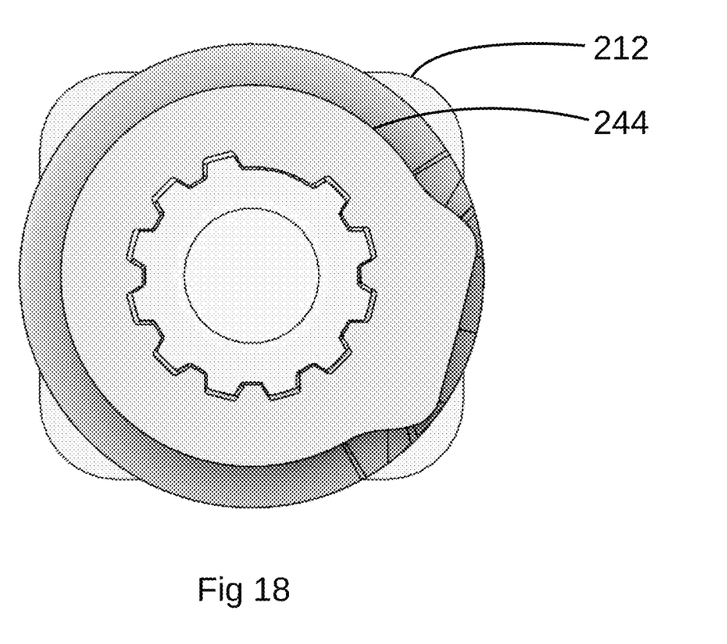
FIG. 18 is a cross-section of splined components of the embodiment of FIG. 16.

The splines may be equally-spaced, in which case the boss 212 and the axle nut 242 may be interconnected, as described above, in multiple relative rotational positions. Alternatively, they may be configured to permit interconnection in a unique relative rotational position, for example, by omission of one spline in each component 212, 242, as shown in FIG. 18.

What is claimed is:

1. A swivel comprising:
   a. a first body component and a second body component;
   b. an interconnection assembly for interconnecting the first body component and the second body component and to allow mutual rotation of the first and the second components about a swivel axis;
   c. a rotation limiting arrangement which, in a release condition, allows free mutual rotation of the first and the second body components and in a locking condition restricts mutual rotation of the first and the second body components; and
   d. a user control operable to selectively cause the rotation limiting arrangement to adopt one of the locking condition and the release condition; wherein:
   the locking condition being selectable between a first locking condition wherein the rotation limiting arrangement substantially prevents mutual rotation of the first and the second body components and a second locking condition wherein the rotation limiting arrangement, allows limited mutual rotation of the first and the second body components by less than 360°.

2. A swivel according to claim 1 in which in the second locking condition the limited mutual rotation is in excess of 90°.

3. A swivel according to claim 1 in which in the second locking condition the limited mutual rotation is in excess of 220°.

4. A swivel according to claim 1 in which in the second locking condition the rotation limiting arrangement is capable of being configured to allow mutual rotation of the first and the second body components in a plurality of separate rotational ranges.

5. A swivel according to claim 1 in which in the first locking condition, the rotation limiting arrangement is capable of being configured to substantially prevent mutual rotation of the first and the second body components at one of several mutual rotational orientations.

6. A swivel according to claim 1 in which the rotation limiting arrangement is capable of being assembled in a plurality of configurations to enable the position of mutual rotation at which rotation is limited to be adjusted.

7. A swivel according to claim 1 in which a locking component of the rotation limiting arrangement, in the first or second locking condition, is operative to obstruct free movement of a cooperating component of the interconnection assembly.

8. A swivel according to claim 7 in which the rotation limiting arrangement is fixed against rotation with respect to the first body component and the cooperating component of the interconnection assembly is fixed against rotation with the second body component.

9. A swivel according to claim 8 in which the cooperating component of the interconnection assembly includes one or more recessed regions, and when the rotation limiting arrangement is in the locking condition, permits the cooperating component to occupy only a rotary position in which a recessed region is proximal to the locking component.

10. A swivel according to claim 7 in which the locking component is capable of being moved by the user control to cause the rotation limiting arrangement to adopt one or other of the locking condition and the release condition.

11. A swivel according to claim 10 in which movement of the locking component to the release position causes a recess of the locking component to move to a position in which it is proximal to the cooperating component and movement of the locking component to a locking position causes a projection of the locking component to move to a position in which it is proximal to the cooperating component.

12. A swivel according to claim 11 in which the interconnection assembly includes a nut and a bolt fixed for rotation with the second body component.

13. A swivel according to claim 12 in which at least two of the nut, the bolt and the second body component are interconnected by splines.

14. A swivel according to claim 12 in which at least two of the nut, the bolt and the second body component are interconnected by polygonal interengaging formations.

15. A swivel according to claim 12 in which the interconnection assembly includes a thrust bearing that is operative to permit rotational movement between the first body component and the nut, the bolt and the second body.

16. A swivel according to claim 12 in which a visible part of one or more of the nut, the bolt and the first body carries indicia that indicate to a user rotational positions of the first and second body components at which the rotation limiting component may adopt the locking condition.

17. A swivel according to claim 1 in which each of the first and the second body components includes a connection formation that allows it to be connected to another component.

* * * * *